United States Patent [19]

Abbes et al.

[11] Patent Number: 4,609,211

[45] Date of Patent: Sep. 2, 1986

[54] REMOTELY DISASSEMBLABLE CONNECTION DEVICE

[75] Inventors: Claude Abbes, St. Etienne; Christian Rouaud, Bourg St. Andeol; Jean Valla, St. Etienne; Raymond de Villepoix, Donzére; Robert Demay, L'Hay les Roses; Robert Forges, Bollene, all of France

[73] Assignee: Commissariat a l'Energie Atomique, Paris, France

[21] Appl. No.: 602,373

[22] Filed: Apr. 20, 1984

[30] Foreign Application Priority Data

Apr. 27, 1983 [FR] France ................................ 83 06963

[51] Int. Cl.⁴ .............................................. F16L 19/02
[52] U.S. Cl. .................................... 285/325; 285/277; 285/309
[58] Field of Search ............... 285/325, 327, 103, 309, 285/350, 277, 349, DIG. 18

[56] References Cited

U.S. PATENT DOCUMENTS

| Re. 23,120 | 6/1949 | Earle et al. ........................... 285/349 |
| 1,866,905 | 7/1932 | Prompt ........................... 285/325 X |
| 2,069,377 | 2/1937 | Matthiessen ........................ 285/277 |
| 2,219,053 | 10/1940 | Osborn ............................... 285/122 |
| 2,747,899 | 5/1956 | Wiltse .................................. 285/341 |
| 2,921,802 | 1/1960 | Canner ........................... 285/349 X |
| 3,365,215 | 1/1968 | Arzt et al. ....................... 285/325 X |
| 3,561,036 | 2/1971 | Crane ............................. 285/277 X |
| 3,708,186 | 1/1973 | Takagi et al. ....................... 285/341 |
| 4,198,080 | 4/1980 | Carpenter ....................... 285/423 X |

FOREIGN PATENT DOCUMENTS

| 311899 | 4/1919 | Fed. Rep. of Germany ...... 285/325 |
| 749271 | 5/1933 | France ............................. 285/325 |
| 1260697 | 4/1961 | France ............................. 285/325 |

Primary Examiner—Richard J. Scanlan, Jr.
Assistant Examiner—Sherish A. Desai
Attorney, Agent, or Firm—Kerkam, Stowell, Kondracki & Clarke

[57] ABSTRACT

A device for the tight connection of a first part to a second part in a direction D.

It comprises a first member having a first conical surface of axis D and angle λ, a second member having a second conical surface of axis D and angle μ and a third member having a third planar surface perpendicular to axis D at least one intermediate member, at least one of the three members being connected to the first or second part. The device also has means for bringing together the first and second members.

9 Claims, 10 Drawing Figures

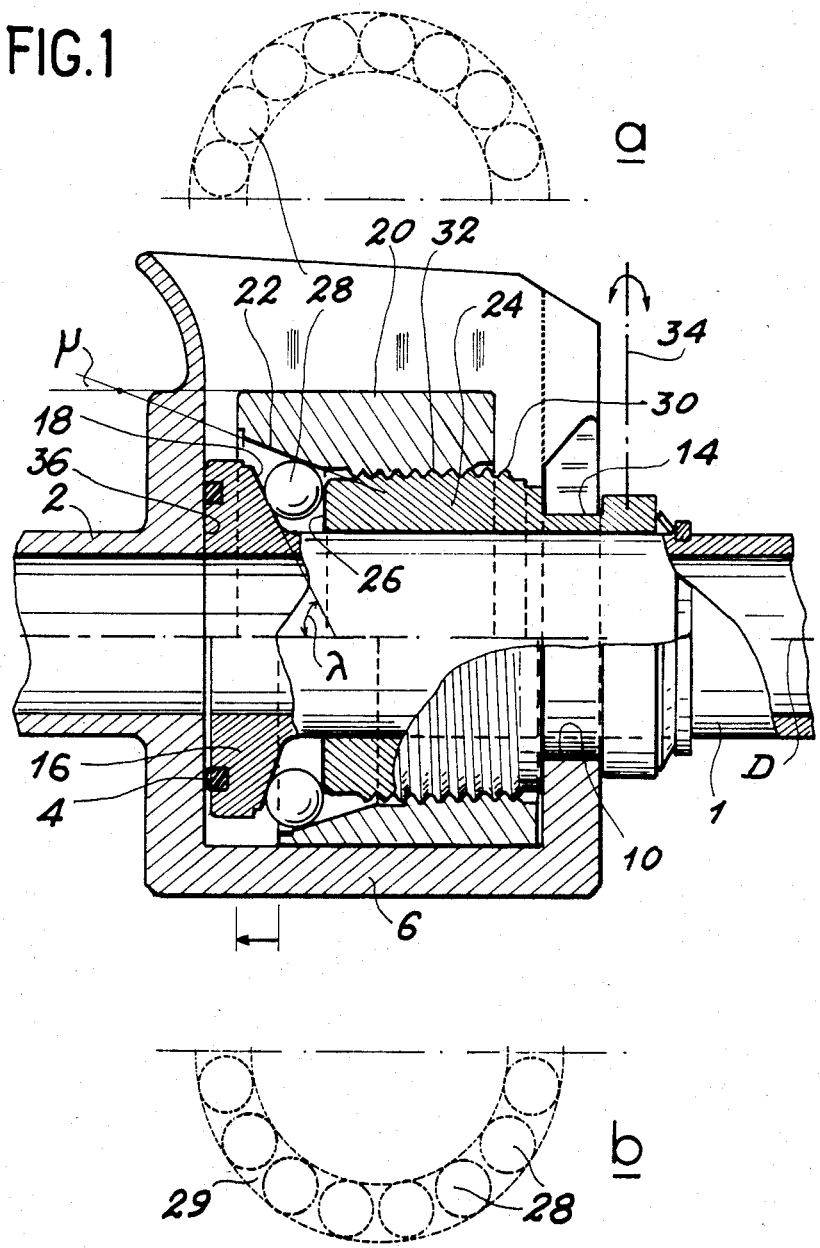

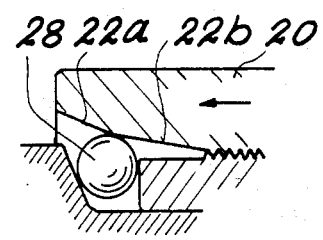
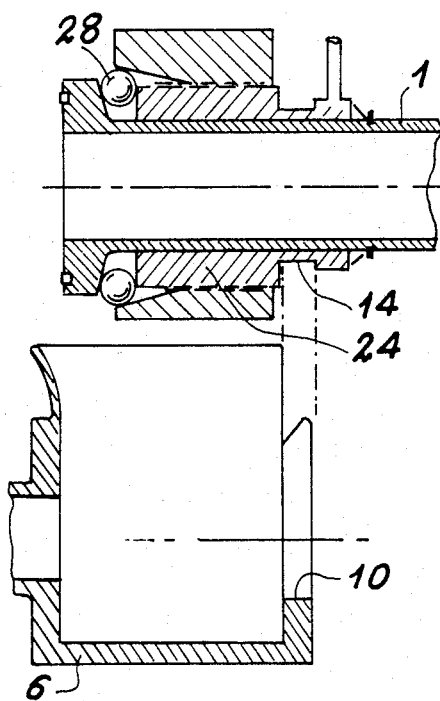
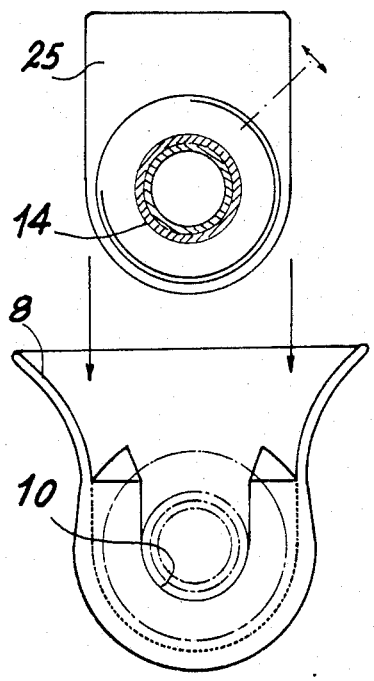
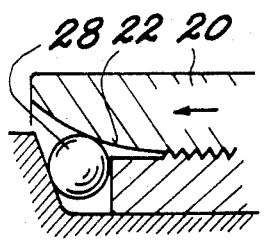

REMOTELY DISASSEMBLABLE CONNECTION DEVICE

BACKGROUND OF THE INVENTION

The invention discloses a device for the tight connection of two parts, e.g. two pipes, having means for linking said pipes in translation and means for compressing a gasket located in the connection plane of the pipes.

In active cells equipped with remote manipulation means, the pipe connection systems must on the one hand permit rapid interventions by limiting the reciprocating movements of the gripping devices to a minimum and must on the other hand ensure a high degree of accuracy in the joints, in order to ensure an appropriate sealing effect following tightening. Moreover, the fluid carried in the pipes are often highly corrosive and the gaskets chosen must be entirely of metal.

French Pat. No. 1,260,697 discloses a remotely disassemblable connection of this type, which is in three parts: a box open on one side in the form of an upwardly directed spout or chute and terminated on the other side by a joining end fitting with a pipe member, a threaded hollow cylinder having at its ends on the one hand a junction end fitting with the other pipe member and on the other a collar, and finally a nut connected to the cylinder manipulated by a rod provided with two curvilinear arms and terminated by a collar, which can be joined with that of the threaded cylinder. The two collars or flanges are housed in the box and can move apart by acting on the nut, in such a way that the cylinder collar crushes an O-ring carried by the box.

However, in a connection device of this type, it is necessary to exert a very considerable tightening or locking force on the locking lever, particularly when the gasket used is a metal joint for which the locking force required is high.

SUMMARY OF THE INVENTION

The object of the invention is to obviate this disadvantage. As characterized in the present claims, it solves the problem consisting of producing a connection device for two parts, e.g. pipes, with which the requisite tightening force is less than that necessary in the prior art devices. This advantage is obtained as a result of the presence of a force multiplication system ensuring, to the right of the gasket, a tightening or locking force which is much higher than the motive force supplied upstream by the remotely manipulated locking means.

More specifically, the force multiplication system comprises a first member having a first conical surface of axis D and angle $\lambda$, a second member having a second conical surface of axis D and angle $\mu$, a third member having a third planar surface perpendicular to axis D, at least one radially extensible and retractable intermediate member positioned within the space defined by said first, second and third surfaces, at least one of the three members being connected to the first or second member, the device also having means for moving together the first and second members.

BRIEF DESCRIPTION OF THE DRAWINGS

The invention is described in greater detail hereinafter relative to non-limitative embodiments and with reference to the attached drawings, wherein show:

FIG. 1—a sectional view of a remotely disassemblable connection device according to the invention.

FIG. 1a—a detailed view of the ring of balls at its smallest diameter.

FIG. 1b—a detailed view of the ring of balls at its largest diameter.

FIGS. 2 and 3—the telescoping of the two parts of the connection device according to the invention.

FIGS. 4 and 5—detailed views showing constructional variants of the conical surfaces.

DETAILED DESCRIPTION OF THE PREFERRED EMBODIMENTS

Figure 6:
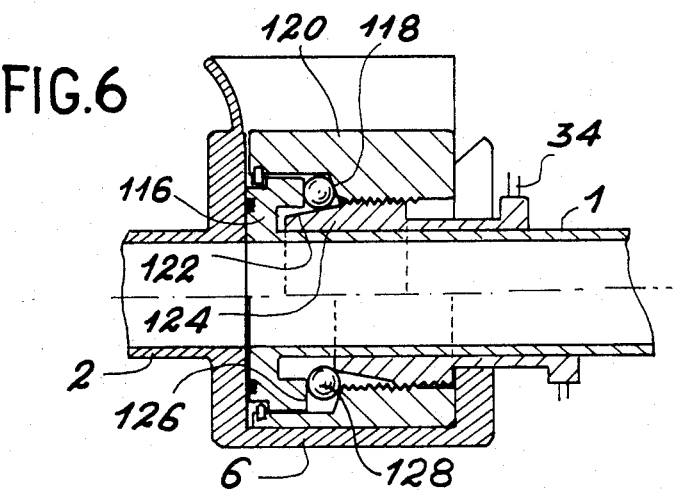
FIG. 6—a longitudinal sectional view showing a second embodiment of a remotely disassemblable connection device according to the invention.

FIG. 1 shows a longitudinal sectional view of a remotely disassemblable connection device according to the invention. This device comprises a first part 1 and a second part 2. In the present embodiment, parts 1 and 2 are constituted by pipes. These pipes of longitudinal axis D have to be connected to one another by means of a high sealing and high reliability static joint 4. When corrosive fluids are carried in pipes 1 and 2, the joint or gasket 4 must be entirely of metal. For example, it is possible to choose a stainless steel, zirconium, tantalum or similarly coated joint.

The device according to the invention has means for linking pipes 1 and 2 in translation. In the embodiment described, these means are constituted by a box 6 welded to the end of pipe 2 and having an introduction spout or chute 8, which is more particularly visible in FIG. 3 and which is terminated by a semicylinder 10. The means for linking pipes 1 and 2 in translation also incorporate a bush 24, which surrounds the end of pipe 1. Bush 24 has a circular groove 14, which engages in semicylinder 10 of box 6. When this operation is completed, pipes 1 and 2 are linked in translation in direction D.

The connection device according to the invention also has a first member having a first conical surface of axis D and angle $\lambda$. In the embodiment of FIG. 1, the first member 16 is joined to pipe 1. Member 16 is in the form of a flange having a surface 18 forming an angle $\lambda$ with the longitudinal axis D of pipes 1 and 2. Angle $\lambda$ is less than 90°, but is close to the latter value and can be for example 75°.

The device has a second member with a second conical surface of axis D. In the embodiment described, this second member is constituted by a bush 20 having a conical bore 22 forming an angle $\mu$ with the longitudinal axis D. For example, angle $\mu$ can be 15°.

The device also has a third member having a third planar surface perpendicular to axis D. In the described embodiment, the third member is constituted by cylindrical bush 24 having a front face 26 opposite to the circular groove 14.

At least one intermediate member 28 is located within the space defined by said first, second and third surfaces 18, 22 and 26. This intermediate member can be constituted by a series of appropriately shaped rollers having between them a clearance permitting their radial movement. As shown in FIG. 1, it can also be constituted by a series of steel or similar balls, whose number is determined in such a way that they are substantially tangential to one another (detailed view a), when the ring of balls is at its smallest diameter. When the ring is at its largest diameter (view b), the balls have a space 29 between them. Particular interest is attached to the use of balls, because it brings about a friction, rolling and sliding mixture favourable to obtaining a high multiplication coefficient.

The device has means for bringing together the first member, namely flange 16 and the second member, namely bush 20. In the embodiment described, these means are constituted by a screw thread 30 on the outer diameter of bush 24 and on the inner bore 32 of bush 20. Bush 24 is immobilized in translation relative to pipes 1 and 2 and relative to box 6 by means of a slot 14 engaged in semicylinder 10. Bush 20 is immobilized in rotation relative to box 6 by the parallelepipedic part 25 (cf FIG. 3), bush 24 being mobile in rotation. It can be displaced by means of a manipulating rod 34. Thus, on rotating bush 24 in an appropriate direction, bush 20 is displaced towards the junction plane 36 of box 6 and flange 16.

The operating principle is as follows. On moving bush 20 from right to left in FIG. 1 (FIGS. 1b and the lower half view showing the unlocked coupling and the upper half view showing the locked coupling) on balls 28 is exerted a radial contact action $$P = \frac{F}{tg(\mu + \phi)},$$

$\phi$ being the friction angle between surface 22 and the surface of balls 28.

In turn, each ball 28 exerts on surface 18 a longitudinal contact action (parallel to axis D)

$$Q = \frac{P}{tg(90 - \lambda + \phi)}.$$

It is assumed that the friction angle between surface 18 and the surface of ball 28 is the same as the friction angle between the surface of the balls and surface 22.

The resultant R of the longitudinal contact action exerted on flange 16 is then equal to $$\frac{F}{tg(\mu + \phi) \cdot tg(90 - \lambda + \phi)}.$$

On assuming that $(90 - \lambda) = \mu = 15°$ and that the friction coefficient is equal to 0.10, which corresponds to an angle $\phi$ of 6°, a force multiplication coefficient equal to 7.14 is obtained. If, for the same values of $\lambda$ and $\mu$, the friction coefficient is 0.21 (which corresponds to an angle $\phi$ of 12°), the multiplication coefficient is 3.85.

FIGS. 2 and 3 show the insertion into one another of two parts of the connection device. The circular groove 14 made in bush 24 is directed longitudinally at semicylinder 10. The special shape of bush 20 can be seen from FIG. 3. It has a semicylindrical shape in its lower portion and a parallelepipedic shape 25 in its upper portion, so as to constitute a rotation locking system.

FIG. 4 shows a constructional variant in which the conical surface 22 is constituted by two conical surfaces 22a, 22b having different conicities. The angle of the conical surface 22a is larger than that of surface 22. Conical surface 22a permits a rapid advance movement of flange 16, when the locking force is not high. Conversely, part 22b makes it possible to exert the final locking force and corresponds to a high force multiplication coefficient.

FIG. 5 shows a variant of FIG. 4. Surface 22 has a continuous variation of the conicity angle. The portion of surface 22 located to the left in FIG. 5 has a larger conicity angle, so as to permit a rapid advance, as explained relative to FIG. 4. This angle progressively decreases so as to reach a final maximum locking force.

FIG. 6 is a longitudinal sectional view of a second embodiment of the invention, in which case the first member is constituted by bush 120. The latter has a first conical surface 118 of axis D and angle $\lambda$. The second member is constituted by a bush 124, which rotates freely on pipe 1. It also has a manipulating rod 34 permitting the rotation thereof.

The third member has a planar surface perpendicular to axis D and is constituted by a flange 116 integral with the end of pipe 1 and having a planar surface 126.

The outer peripheral circumference of bush 124 is threaded. Bush 120 has a corresponding thread in its inner part. In this embodiment, bush 120 is locked in rotation, as for the embodiment described relative to FIGS. 1 to 3. It abuts against the right-hand portion of fixed box 6 level with the semicylinder 10 of FIG. 1. Bush 124 is mobile in rotation and in translation. Balls 128 bear against the fixed surface 118 of ring 120 in order to engage flange 116 against the joint plane.

Figure 7:
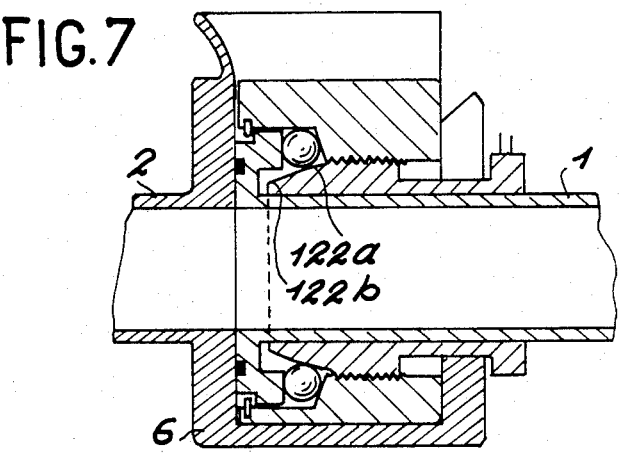
FIG. 7—a variant of FIG. 6 with a second conical surface formed from two portions having different conicity angles.

FIG. 7 is a constructional variant of FIG. 6, which differs therefrom solely as a result of the fact that the second conical surface of axis D 122 and angle $\mu$ is in two parts, namely a first part 122b with a larger conicity angle permitting a rapid advance and a part 122a with a smaller conicity angle permitting the final tightening or locking. It is therefore a question of transposing to the embodiment of FIG. 6 what was explained relative to FIG. 4. Obviously, surface 112 could also have a variable curvature.

Figure 8:
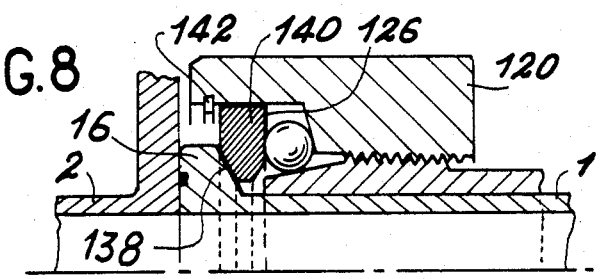
FIG. 8—a variant of the embodiment of FIG. 6.

FIG. 8 shows a modification of the embodiment described relative to FIG. 6. The modification consists of flange 116 carrying the planar surface 126 being made in two parts. It consists of a flange 16 having a bearing surface 138 and a joined bush 140 having the planar surface 126. The external diameter of bush 140 corresponds to the diameter of a bore of bush 120. A locking part, such as a circlip 142 maintains bush 140 within the bore of bush 120. This solution has the advantage of simplifying manufacture of flange 116.

Figure 9:
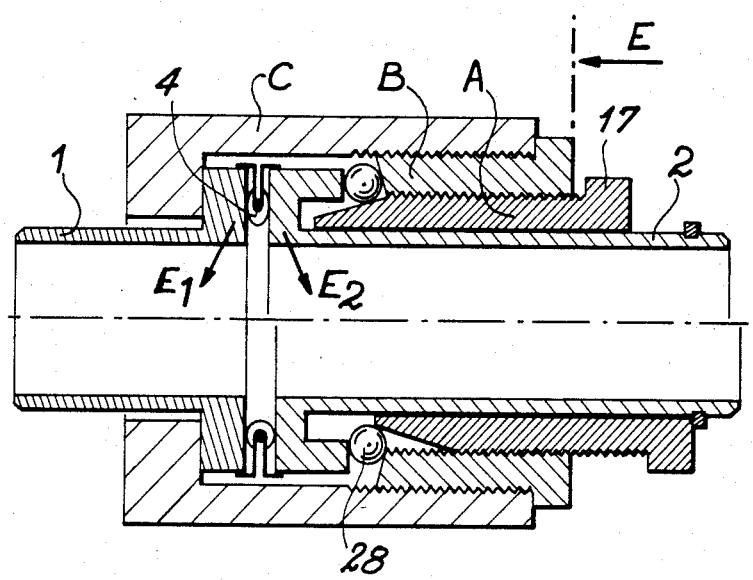
FIGS. 9 and 10 (view of FIG. 9 along E)—another variant of the remotely disassemblable device.
Figure 10:
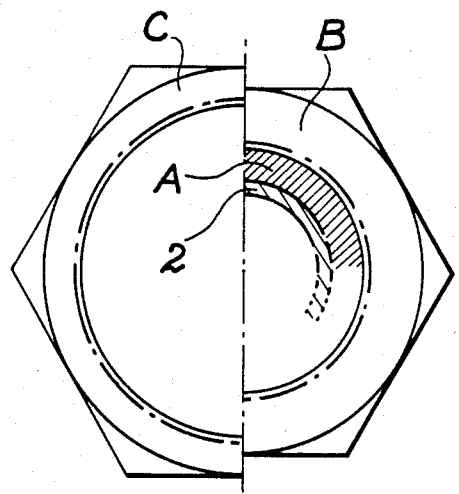

Another variant is shown in FIGS. 9 and 10, where the conical surface of angle $\lambda$ is formed on bush B, the conical surface of angle $\mu$ on bush A and the planar surface perpendicular to axis D on end fitting E2 joined to part 2.

The following results can be obtained through the use of the force multiplication system of the biconical connection according to the invention. It considerably reduces the locking forces for the presently used standard dimensions. It increases the diameters to beyond the values presently used and which are limited by the locking force values. On referring to FIG. 9, the connection or coupling is effected in the following way. Pipes 1 and 2 have the welded end fittings $E_1$ and $E_2$ at their ends. End fitting $E_2$ carries the force multiplication system according to the invention and consists of parts A and B, as well as the ring of balls. End fitting $E_1$ carries part C, which is a shoulder nut. On the lower half-section of FIG. 9 and after placing gasket 4 between end fittings $E_1$ and $E_2$, nut C is manually screwed onto part B until contact is made with shoulder 17. In the upper half-section of FIG. 9, the gasket is locked between end fittings $E_1$ and $E_2$ as a result of the rotation of nut A, which leads to the advance of the conical surface of angle $\mu$. This brings about an outward radial displacement of balls 28, which bear on the conical surface of angle $\lambda$ acting on end fitting $E_2$ and compress gasket 4.

What is claimed is:

1. A device for the tight connection of a first part to a second part in a direction along an axis D, incorporating means for linking said first and second parts in translation in direction along an axis O and means for compressing a gasket between said parts, wherein it also comprises a first member having a first conical surface at an angle $\lambda$ with respect to the axis D, a second member having a second conical surface at an angle $\mu$ with respect to the axis D and a third member having a third planar surface perpendicular to axis D, said first, second and third surfaces defining a space, at least one radially movable intermediate member located within the space defined by said first, second and third surfaces, at least one of the three members being linked to the first or the second member, the device also having means for moving the first and second members relative to one another.

2. A device according to claim 1, wherein the means for moving the first and second members relative to one another comprises two bushes coaxial with axis D, the two bushes comprising an inner bush and an outer bush, said bushes being rotatable relative to one another.

3. A device according to claim 2, wherein the moving means comprises a screw thread, one of the bushes being provided with rotation-locking means.

4. A device according to claim 2, wherein the means for linking the first and second parts comprises a box which is integral with the second part, said box having an introduction spout or chute terminated by a semicylinder, as well as a groove made in the inner bush, said groove penetrating the semicylinder of the box.

5. A device according to claim 1, wherein the intermediate member placed inside the space defined by the first, second and third surfaces is constituted by balls.

6. A device according to claim 4, wherein the first member is constituted by a flange joined to the first part, said second member being constituted by the outer bush and the third member by the inner bush.

7. A device according to claim 1, wherein at least one of the said first and second conical surfaces is constituted by two cones having different angles.

8. A device according to claim 1, wherein at least one of the said first and second conical surfaces has a variable curvature.

9. A device according to claim 2, wherein the means for linking the first part with the second part in translation are constituted by a bush, which is locked in translation with respect to the first part, and by a second bush screwed into the first bush.

* * * * *